United States Patent
Ryu et al.

(10) Patent No.: US 12,086,437 B2
(45) Date of Patent: Sep. 10, 2024

(54) MEMORY CONTROLLER AND MEMORY SYSTEM FOR ALLOCATING MEMORY BASED ON THE RATIO OF HOT/COLD PAGES

(71) Applicant: SK hynix Inc., Gyeonggi-do (KR)

(72) Inventors: Jun Hee Ryu, Gyeonggi-do (KR); Chang Hyun Park, Gyeonggi-do (KR); Kwang Jin Ko, Gyeonggi-do (KR); Young Pyo Joo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 9 days.

(21) Appl. No.: 17/959,908

(22) Filed: Oct. 4, 2022

(65) Prior Publication Data

US 2023/0342046 A1 Oct. 26, 2023

(30) Foreign Application Priority Data

Apr. 26, 2022 (KR) .................. 10-2022-0051119

(51) Int. Cl.
*G06F 3/06* (2006.01)

(52) U.S. Cl.
CPC .......... *G06F 3/0631* (2013.01); *G06F 3/0604* (2013.01); *G06F 3/0647* (2013.01); *G06F 3/0683* (2013.01)

(58) Field of Classification Search
CPC .... G06F 3/0631; G06F 3/0604; G06F 3/0647; G06F 3/0683

USPC ......................................................... 711/154
See application file for complete search history.

(56) References Cited

U.S. PATENT DOCUMENTS

| | | | |
|---|---|---|---|
| 2013/0080689 A1* | 3/2013 | Jo ..................... | G06F 12/0246 711/E12.008 |
| 2020/0218668 A1* | 7/2020 | Han ................... | G06F 13/1668 |
| 2021/0096745 A1* | 4/2021 | Ro ...................... | G06F 3/0604 |
| 2022/0092724 A1* | 3/2022 | Madan ............... | G06F 3/0679 |

FOREIGN PATENT DOCUMENTS

| KR | 1020070008403 A | 1/2007 |
|---|---|---|
| KR | 1020130076429 A | 7/2013 |
| KR | 1020200108359 A | 9/2020 |
| KR | 1020220030090 A | 3/2022 |

* cited by examiner

*Primary Examiner* — Than Nguyen
(74) *Attorney, Agent, or Firm* — IP & T GROUP LLP (57) ABSTRACT

The present technology relates to an electronic device. According to the present technology, a memory controller may include an attribute determiner configured to determine an attribute of each of a plurality of pages included in a first external device to indicate one of a hot page and a cold page, based on an access interval which is an interval from a time at which data is stored in each of the pages to a time at which access to the data is requested, a page analyzer configured to determine a ratio of hot pages having a hot page attribute to the plurality of pages, and a memory allocator configured to control one of the first external device and the second external device to store therein externally provided data based on the ratio of hot pages.

18 Claims, 9 Drawing Sheets

| pg_inf | r_t | rr_t | raccs_t | th_t | h/c_inf |
|---|---|---|---|---|---|
| 1 | 4 | 9 | 5 | 5 | 0 |
| 2 | 8 | 15 | 7 | 6 | 0 |
| 3 | 5 | 7 | 2 | 3 | 1 |
| 4 | 8 | 9 | 1 | 4 | 1 |
| 5 | 14 | 22 | 8 | 7 | 0 |
| ⋮ | ⋮ | ⋮ | ⋮ | ⋮ | ⋮ |

MEMORY CONTROLLER AND MEMORY SYSTEM FOR ALLOCATING MEMORY BASED ON THE RATIO OF HOT/COLD PAGES

CROSS-REFERENCE TO RELATED APPLICATION

The present application claims priority under 35 U.S.C. § 119(a) to Korean patent application number 10-2022-0051119 filed on Apr. 26, 2022, the entire disclosure of which is incorporated by reference herein.

BACKGROUND

Field of Invention

Various embodiments of the present disclosure relate to an electronic device, and more particularly to a memory controller and a memory system including the memory controller.

Description of Related Art

A heterogeneous memory system is a system including memory devices having different operation speeds. In detail, a heterogeneous memory system is composed of memory having a relatively high operation speed and memory having a relatively low operation speed. Generally, a memory device having a high operation speed has a smaller storage capacity, whereas a memory device having a low operation speed has a larger storage capacity. Accordingly, in order to improve the performance of a heterogeneous memory system having a limited storage capacity, there is a need to store hot data more frequently requested by a host in a memory device having a high operation speed and to store cold data less frequently requested by the host in a memory device having a low operation speed. Therefore, it may be important to accurately check whether the attribute of data requested by a host indicates hot data or cold data.

SUMMARY

Various embodiments of the present disclosure are directed to a memory controller that is capable of improving the speed at which data is provided in response to an external request and a memory system including the memory controller.

An embodiment of the present disclosure may provide for a memory controller. The memory controller may include an attribute determiner configured to determine an attribute of each of a plurality of pages included in a first external device to indicate one of a hot page and a cold page, based on an access interval which is an interval from a time at which data is stored in each of the plurality of pages to a time at which access to the data is requested, a page analyzer configured to determine a ratio of hot pages having a hot page attribute to the plurality of pages, and a memory allocator configured to control the first external device and the second external device to store therein externally provided data based on the ratio of hot pages.

An embodiment of the present disclosure may provide for a method of operating a memory controller. The method may include generating pieces of attribute information respectively for a plurality of pages included in a first external device based on an access interval which is an interval from a time at which data is stored in each of the plurality of pages to a time at which access to the data is requested, wherein the attribute information for each of the plurality of pages corresponds to one of a hot page and a cold page, generating information about a ratio of hot pages having a hot page attribute to the plurality of pages, and storing externally provided data in the first external device or a second external device based on the information about the ratio of hot pages.

An embodiment of the present disclosure may provide for a memory system. The memory system may include a first memory including a plurality of pages, a second memory of a type different from a type of the first memory, and a memory controller configured to determine each of the plurality of pages to indicate a hot page or a cold page depending on whether access to data stored in each of the plurality of pages is requested within a preset time period from a time at which the data is stored in each of the plurality of pages in response to an external request, and control one of the first memory and the second memory to store therein externally provided data based on a number of hot pages.

An embodiment of the present disclosure may provide for a method of operating a memory controller. The method may include determining, as a hot region, each memory unit within a first memory device when an interval is less than a threshold, the memory unit being accessed at the interval, and controlling, based on a number of hot regions within the first memory device, a second memory device to store data therein without controlling the first memory device to further store data therein. Wherein the second memory device has a faster operating speed than the first memory device.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
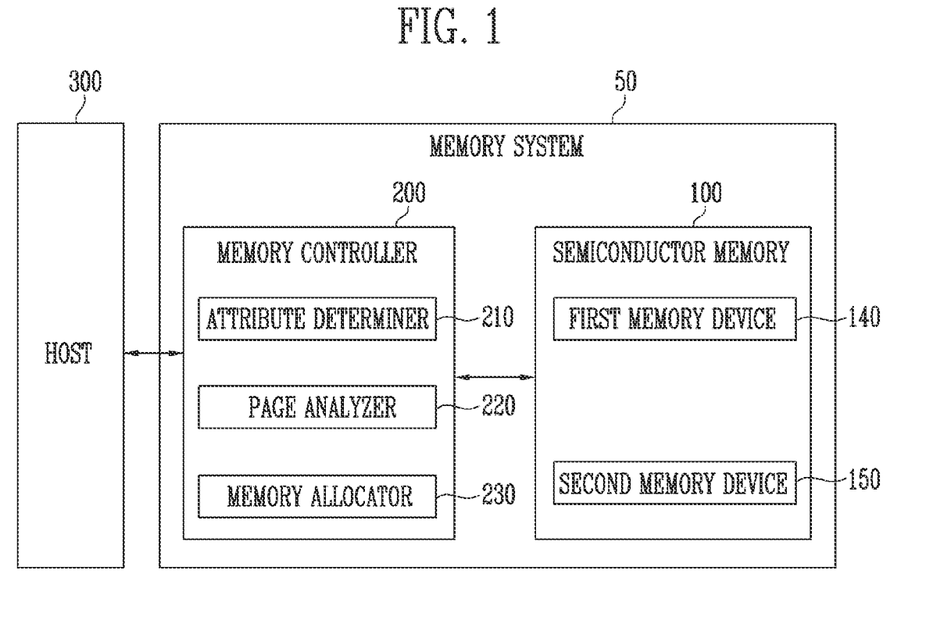
FIG. 1 is a diagram illustrating a memory system according to an embodiment of the present disclosure.

FIG. 1 is a diagram illustrating a memory system according to an embodiment of the present disclosure.

Referring to FIG. 1, a memory system 50 may include a semiconductor memory 100 and a memory controller 200 which controls the operation of the semiconductor memory 100. The memory system 50 may be a device which stores data under the control of a host 300, such as a mobile phone, a smartphone, an MP3 player, a laptop computer, a desktop computer, a game console, a TV, a tablet PC, or an in-vehicle infotainment system.

The memory system 50 may be manufactured as any of various types of storage devices depending on a host interface that is a scheme for communication with the host 300. For example, the memory system 50 may be implemented as any of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-e or PCIe) card-type storage device, a compact flash (CF) card, a smart media card, and a memory stick.

The memory system 50 may be manufactured in any of various types of package forms. For example, the memory system 50 may be manufactured in any of various types of package forms, such as package on package (POP), system in package (SIP), system on chip (SOC), multi-chip package (MCP), chip on board (COB), wafer-level fabricated package (WFP), and wafer-level stack package (WSP).

The semiconductor memory 100 may store data. The semiconductor memory 100 may be operated under the control of the memory controller 200.

In an embodiment, the semiconductor memory 100 may be implemented as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory, a resistive RAM (RRAM), a phase-change RAM (PRAM), a magnetoresistive RAM (MRAM), a ferroelectric RAM (FRAM), or a spin transfer torque RAM (STT-RAM).

The semiconductor memory 100 may include a first memory device 140 and a second memory device 150.

The first memory device 140 and the second memory device 150 may be different types of memory devices. In detail, the second memory device 150 may be a memory device that responds to a request from the host 300 at a higher operation speed than the first memory device 140. The operation speed may include a write speed at which data is stored and a read speed at which stored data is read. In an embodiment, the first memory device 140 may be a nonvolatile memory device, and the second memory device 150 may be a volatile memory device. The nonvolatile memory device may be a flash memory, and the volatile memory device may be a dynamic random access memory (DRAM). In an embodiment, both the first memory device 140 and the second memory device 150 may be volatile memory devices. In an embodiment, both the first memory device 140 and the second memory device 150 may be nonvolatile memory devices. The first memory device 140 or the second memory device 150 may include a plurality of memory blocks. One memory block may include a plurality of pages. In an embodiment, a page may be the unit by which data is stored in the first memory device 140 or the unit by which data stored in the first memory device 140 is read.

Each of the first memory device 140 and the second memory device 150 may receive a command from the memory controller 200, and may access a selected area. Each of the first memory device 140 and the second memory device 150 may perform an operation indicated by the command on the selected area. For example, each of the first memory device 140 and the second memory device 150 may perform a write operation (i.e., a program operation), a read operation, and an erase operation. During a write operation, each of the first memory device 140 and the second memory device 150 may program data to a selected area. During a read operation, each of the first memory device 140 and the second memory device 150 may read data from a selected area. During an erase operation, each of the first memory device 140 and the second memory device 150 may erase data stored in a selected area. In an embodiment, each of the first memory device 140 and the second memory device 150 may include a plurality of memory chips.

The memory controller 200 may control the overall operation of the memory system 50. The memory controller 200 may control the first memory device 140 and the second memory device 150 so that a write operation, a read operation, or an erase operation is performed in response to a request received from the host 300. During a write operation, the memory controller 200 may provide a write command and data to the first memory device 140 or the second memory device 150. During a read operation, the memory controller 200 may provide a read command to the first memory device 140 or the second memory device 150. During an erase operation, the memory controller 200 may provide an erase command to the first memory device 140 or the second memory device 150.

In an embodiment, the memory controller 200 may include an attribute determiner 210, a page analyzer 220, and a memory allocator 230. The attribute determiner 210 may determine the attributes of a plurality of pages included in each of the first memory device 140 and the second memory device 150. The attribute of each of the plurality of pages may indicate one of a hot page and a cold page. The attributes of the plurality of pages may be determined based on an access interval from the time at which data is stored in the plurality of pages to the time at which access to the data is requested. In an example, when access to data is requested within a preset time period from the time at which the data is stored in one of the plurality of pages, the attribute of the one page may be determined to indicate a hot page. In an example, when access to data is requested after the preset time period from the time at which the data is stored in one of the plurality of pages, the attribute of the one page may be determined to indicate a cold page. The time at which access to data is requested may be the time at which the host requests reading of data stored in the first memory device 140 or the second memory device 150. The attribute determiner 210 may determine the attribute of each of the plurality of pages depending on the length of the access interval from the time at which data is stored in each of the plurality of pages to the time at which access to the stored data is requested.

The page analyzer 220 may determine the ratio of hot pages having a hot page attribute to the plurality of pages having attributes determined by the attribute determiner 210. In an embodiment, the page analyzer 220 may determine the ratio of hot pages having a hot page attribute to the plurality of pages included in the first memory device 140.

The memory allocator 230 may control the operation of each of the first memory device 140 and the second memory device 150. In an embodiment, the memory allocator 230 may control the first memory device 140 or the second memory device 150 so that data provided from the host 300 is stored in the first memory device 140 or the second memory device 150. The memory allocator 230 may control movement of data between the first memory device 140 and the second memory device 150. In an example, when the attribute of a page including the data stored in the first memory device 140 indicates a hot page, the memory allocator 230 may control the first memory device 140 and the second memory device 150 so that data stored in the first memory device 140 is stored in the second memory device 150. In an example, when the attribute of a page including the data stored in the second memory device 150 indicates a cold page, the memory allocator 230 may control the first memory device 140 and the second memory device 150 so that data stored in the second memory device 150 is stored in the first memory device 140.

In an embodiment, the memory allocator 230 may determine the memory device in which subsequent data provided by the host 300 is to be stored, based on the ratio of hot pages having a hot page attribute. In detail, the memory allocator 230 may control the first memory device 140 and the second memory device 150 so that subsequent data is stored in the first memory device 140 or the second memory device 150 depending on the ratio of hot pages. For example, because the second memory device 150 is operated at a higher speed than the first memory device 140, it may be profitable to store data more frequently requested by the host in the second memory device 150. Therefore, the memory allocator 230 may control the first memory device 140 and the second memory device 150 so that data is stored in the first memory device 140 or the second memory device 150 depending on the attributes of the plurality of pages or the ratio of hot pages, thus improving the speed at which data is provided in response to a request from the host 300.

The host 300 may communicate with the memory system 50 using at least one of various communication standards or Interfaces such as universal serial bus (USB), Serial AT Attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
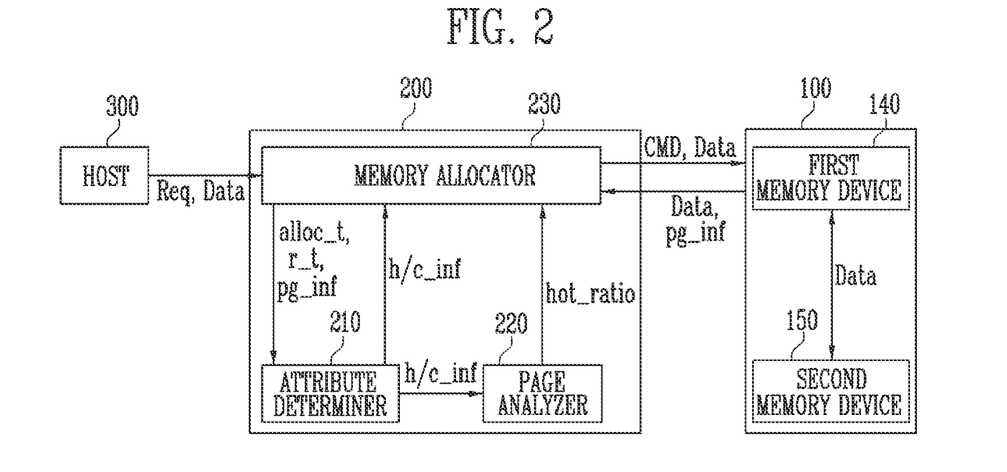
FIG. 2 is a diagram illustrating the operation of a memory system according to an embodiment of the present disclosure.

FIG. 2 is a diagram illustrating the operation of a memory system according to an embodiment of the present disclosure.

A semiconductor memory 100, a memory controller 200, and a host 300, which are illustrated in FIG. 2, may represent the semiconductor memory 100, the memory controller 200, and the host 300, respectively, which are illustrated in FIG. 1.

Referring to FIG. 2, the memory allocator 230 may receive a request Req and data Data from the host 300. The memory allocator 230 may provide both a command CMD and the data Data to the first memory device 140 or the second memory device 150 so that the data is stored in the first memory device 140 or the second memory device 150 in response to the request Req received from the host 300. In this case, the memory allocator 230 may provide the attribute determiner 210 with information about the time alloc_t at which data Data is stored in the first memory device 140 or the second memory device 150.

Thereafter, the memory allocator 230 may receive the request Req to access the data Data stored in the first memory device 140 or the second memory device 150 from the host 300. The request Req from the host may be a request to read the data Data. The memory allocator 230 may be provided with data Data and information pg_inf about a page in which the data Data is stored from the first memory device 140 or the second memory device 150. The memory allocator 230 may be provided with the data Data from the first memory device 140 or the second memory device 150, and may provide the data Data to the host 300. Also, the memory allocator 230 may provide information about the time r_t at which access to the data is requested and information pg_inf about a page in which the data is stored to the attribute determiner 210.

The attribute determiner 210 may determine the attributes of a plurality of pages based on the information pg_inf about the page in which the data is stored, the information about the time alloc_t at which the data is stored, and the information about the time r_t at which access to the data is requested. In an embodiment, the attribute determiner 210 may set an access interval based on the information about the time alloc_t at which the data is stored and the information about the time r_t at which access to the data is requested. The access interval may be an interval from the time at which the data is stored in the first memory device 140 or the second memory device 150 to the time at which access to the data is requested. The attribute determiner 210 may determine the attribute of each of the plurality of pages to indicate one of a hot page and a cold page depending on the length of the access interval. Thereafter, the attribute determiner 210 may provide information h/c_inf about the attributes of the plurality of pages to the page analyzer 220 and to the memory allocator 230.

The memory allocator 230 may control the movement of data Data between the first memory device 140 and the second memory device 150 based on the information h/c_inf about the attributes of the plurality of pages. In an embodiment, the memory allocator 230 may control the first memory device 140 and the second memory device 150 so that, when the attribute of a page in which data Data is stored indicates a hot page and the data Data is stored in the first memory device 140, the data Data is stored in the second memory device 150. In an embodiment, after the data Data stored in the first memory device 140 is read by the memory allocator 230, the data Data may be stored in the second memory device 150. For example, the memory allocator 230 may control the first memory device 140 and the second memory device 150 so that the data Data stored in the first memory device 140 is read, errors in the read data are corrected, and error-corrected data is then stored in the second memory device 150. In an embodiment, the memory allocator 230 may control the first memory device 140 and the second memory device 150 so that, when the attribute of a page in which data Data is stored indicates a cold page and the data Data is stored in the second memory device 150, the data Data is stored in the first memory device 140. In an embodiment, after the data Data stored in the second memory device 150 is read into the memory allocator 230, the data Data may be stored in the first memory device 140. For example, the memory allocator 230 may control the first memory device 140 and the second memory device 150 so that the data Data stored in the second memory device 150 is read, errors in the read data are corrected, and error-corrected data is then stored in the first memory device 140.

The page analyzer 220 may determine the ratio of hot pages hot_ratio having a hot page attribute to the plurality of pages based on the information h/c_inf about the attributes of the plurality of pages. In an embodiment, the page analyzer 220 may determine the ratio of hot pages hot_ratio having a hot page attribute to the plurality of pages included in the first memory device 140. In detail, the page analyzer 220 may count the number of pages having a hot page attribute and the number of pages having a cold page attribute, among the plurality of pages included in the first memory device 140. Also, the page analyzer 220 may determine the ratio of the number of hot pages to the sum of the number of hot pages and the number of cold pages to be the ratio of hot pages hot_ratio. Thereafter, the page analyzer 220 may provide information about the ratio of hot pages hot_ratio to the memory allocator 230.

Figure 3:
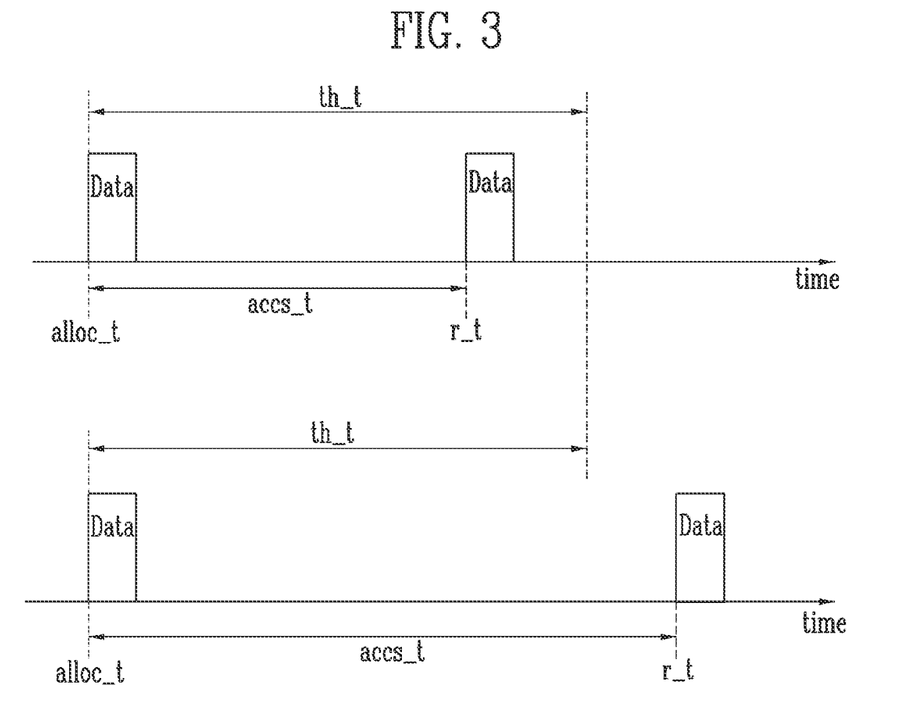
FIG. 3 is a diagram illustrating an operation of determining the attributes of a plurality of pages depending on an access interval according to an embodiment of the present disclosure.

FIG. 3 is a diagram illustrating an operation of determining the attributes of a plurality of pages depending on an access interval according to an embodiment of the present disclosure.

In FIG. 3, the horizontal axis of each of the graphs indicates time.

Referring to FIG. 3, the attribute determiner 210 of FIG. 2 may determine the attributes of a plurality of pages by comparing an access interval accs_t with a preset interval th_t. The access Interval accs_t may be set based on the time alloc_t at which data is stored in a first memory device or a second memory device and the time r_t at which access to data is requested. In detail, the difference between the time r_t at which access to data is requested and the time alloc_t at which data is stored in the first memory device or the second memory device may be set as the access interval accs_t.

The graph in the upper portion of FIG. 3 shows the case in which the access Interval accs_t for data is shorter than the preset interval th_t. That is, when the access interval accs_t for data is shorter than the preset interval th_t, the attribute of a page in which the data is stored may be determined to indicate a hot page. That is, the graph in the upper portion of FIG. 3 shows that access to data is requested within a preset time period from the time at which the data is stored in the first memory device or the second memory device, and thus the attribute of the page in which the data is stored may be determined to indicate a hot page.

The graph in the lower portion of FIG. 3 shows the case in which the access interval accs_t for data is longer than the preset interval th_t. That is, when the access interval accs_t for data is equal to or longer than the preset interval th_t, the attribute of the page in which the data is stored may be determined to indicate a cold page. The graph in the lower portion of FIG. 3 shows that access to data is requested after the preset time period from the time at which the data is stored in the first memory device or the second memory device, and thus the attribute of the page in which the data is stored may be determined to indicate a cold page.

Figure 4:
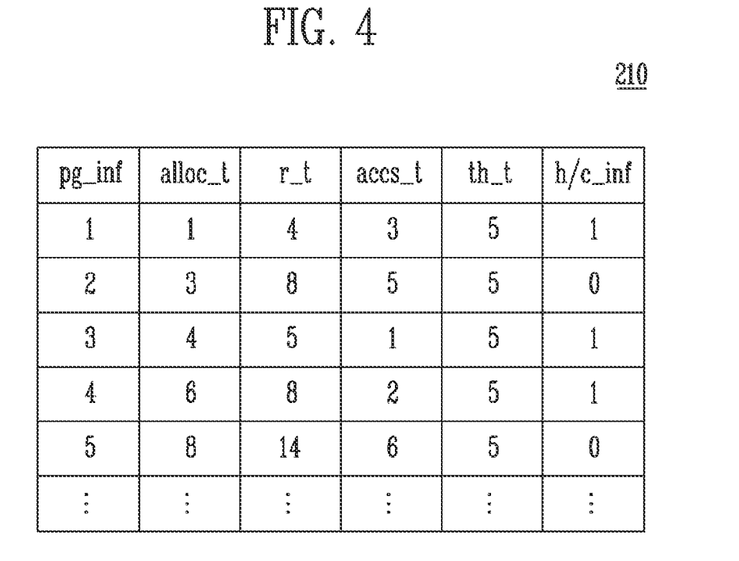
FIG. 4 is a diagram illustrating attribute information for a plurality of pages generated by an attribute determiner according to an embodiment of the present disclosure.

FIG. 4 is a diagram illustrating attribute information for a plurality of pages generated by an attribute determiner according to an embodiment of the present disclosure.

Referring to FIG. 4, the attribute determiner 210 may store information pg_inf about pages in which pieces of data are respectively stored, the time alloc_t at which the corresponding data is stored in a first memory device or a second memory device, the time r_t at which access to data is requested, an access interval accs_t, a preset interval th_t, and information h/c_inf about the attributes of the pages. The information pg_inf about pages, stored in the attribute determiner 210, may be information about a plurality of pages included in the first memory device.

First, the case in which data is stored in a first page in the table shown in FIG. 4 is described by way of example. The attribute determiner 210 may be provided with information about the time alloc_t at which data is stored in the first page from the memory allocator 230, and may then store the time alloc_t information. For example, the time at which the data is stored in the first page may be 1. Thereafter, when access to the data stored in the first page is requested, the attribute determiner 210 may receive information about the time r_t at which access to the data is requested from the memory allocator 230, and may store the time r_t information. For example, the time at which access to the data stored in the first page is requested may be 4. Also, the attribute determiner 210 may set the access interval accs_t based on the time at which the data is stored in the first page and the time at which access to the data stored in the first page is requested. In an embodiment, the attribute determiner 210 may set the difference between the time at which access to the data stored in the first page is requested and the time at which the data is stored in the first page, as the access interval accs_t. For example, the attribute determiner 210 may set the access interval accs_t for the data stored in the first page to be 3.

The attribute determiner 210 may determine the attribute of the corresponding page by comparing the access interval accs_t with the preset interval th_t. In FIG. 4, the case in which the preset interval th_t is is described by way of example. For example, because the access interval accs_t for the data stored in the first page is shorter than the preset interval th_t, the attribute of the first page may be determined to indicate a hot page. A hot page may be represented by a logical value of "1". A cold page may be represented by a logical value of "0". That is, because access to the data stored in the first page is requested within the preset time period, the attribute of the first page may be determined to indicate a hot page.

In an embodiment, the attribute determiner 210 may store only some of the information pg_inf about pages in which data is stored, the time alloc_t at which data is stored in a first memory device or a second memory device, the time r_t at which access to data is requested, the access interval accs_t, the preset interval, and information h/c_inf about the attributes of the pages. In an example, the attribute determiner 210 may store only the information pg_inf about pages in which data is stored, the access interval accs_t, the preset interval th_t, and the information h/c_inf about the attributes of the pages. In detail, the attribute determiner 210 may store only the access interval accs_t, obtained by calculating the interval from the time at which data is stored to the time at which access to the data is requested, without storing information about the time alloc_t at which data is stored in the first memory device or the second memory device or the time r_t at which access to the data is requested. In an example, the attribute determiner 210 may store only the time alloc_t at which data is stored in the first memory device or the second memory device, and may set the access interval accs_t for the page in which data is stored at the time point at which access to the data is requested, thus determining the attribute of the page.

In an embodiment, the attribute determiner 210 may not individually store information having the same value, among respective pieces of information corresponding to the plurality of pages, for each page. For example, the preset interval th_t may be a value identically used to determine the attributes of the plurality of pages. Here, the attribute determiner 210 may not store the value of the preset interval th_t for the table of each of the plurality of pages. When the preset interval th_t has a constant value, it may be stored as one value that is used to determine the attributes of the plurality of pages. In an embodiment, the preset interval th_t may be designated differently depending on the attributes of the plurality of pages. Here, the preset interval th_t may be stored to correspond to each of the plurality of pages.

As in the case where data stored in the first page was described as an example, the attribute determiner 210 may determine the information h/c_inf about the attribute of each of the plurality of pages based on the result of a comparison between the access interval accs_t for data stored in each of the plurality of pages and the preset interval th_t.

Thereafter, the attribute determiner 210 may generate attribute information for each of the plurality of pages and provide the attribute information to the page analyzer 220. Here, only some of pieces of attribute information for the plurality of pages, stored in the attribute determiner 210, may be provided to the page analyzer 220. When the ratio of hot pages is determined by the page analyzer 220 based on the attribute information for pages in which data recently requested to be accessed is stored, the frequency of requests to access subsequent data provided by the host may be accurately predicted. For example, the attribute determiner 210 may provide the attribute Information for pages, the attributes of which are most recently determined, among the pieces of attribute information for the plurality of pages, to the page analyzer 220. For example, in FIG. 4, the case in which pieces of attribute information for the first to fifth pages are most recently determined is illustrated. Here, the attribute determiner 210 may provide only the pieces of attribute information for the first to fifth pages to the page analyzer 220.

Thereafter, the page analyzer 220 may determine the ratio of hot pages having a hot page attribute based on the provided attribute information for the plurality of pages. In an embodiment, the page analyzer 220 may determine the ratio of hot pages having a hot page attribute to the plurality of pages, having attributes, included in the first memory device to be the ratio of hot pages. In detail, the ratio of hot pages may be determined to be the ratio of the number of hot pages to the sum of the number of hot pages and the number of cold pages, among the plurality of pages included in the first memory device. For example, the page analyzer 220 may be provided with the attribute information for the first to fifth pages, and may then determine the ratio of hot pages. Because the number of hot pages is 3 and the number of cold pages is 2, among the first to fifth pages, the ratio of hot pages may be 0.6. This means that the attributes of pages in which recently accessed data is stored indicate a higher tendency to be a hot page.

Figure 5:
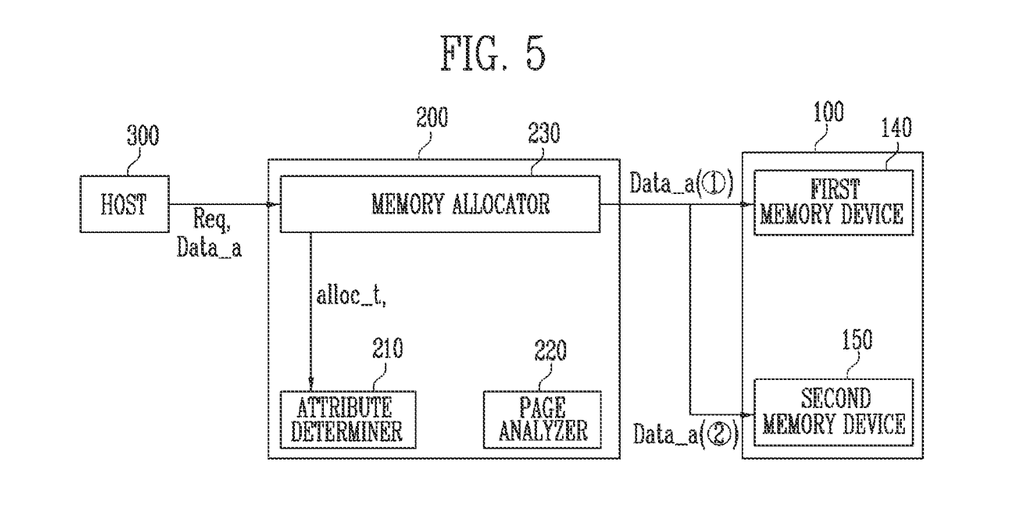
FIG. 5 is a diagram illustrating an operation of storing subsequent data provided by a host in a memory device according to an embodiment of the present disclosure.

FIG. 5 is a diagram illustrating an operation of storing subsequent data provided by a host in a memory device according to an embodiment of the present disclosure.

Referring to FIG. 5, the host may provide subsequent data Data_a, along with a request Req, to the memory allocator 230. The memory allocator 230 may determine the memory device in which the subsequent data Data_a is to be stored based on the ratio of hot pages, provided from the page analyzer 220. In detail, the memory allocator 230 may compare the ratio of hot pages with a first threshold ratio. The first threshold ratio may be a ratio that is a criterion for comparing the attributes of the plurality of pages to determine whether the attributes of a plurality of pages included in the first memory device 140 are close to attributes indicating a tendency to be a hot page or a cold page. In an example, the memory allocator 230 may control the second memory device 150 so that, when the ratio of hot pages is greater than the first threshold ratio, the subsequent data Data_a is stored in the second memory device 150 (see case ② in FIG. 5). In an example, the memory allocator 230 may control the first memory device 140 so that, when the ratio of hot pages is less than or equal to the first threshold ratio, the subsequent data Data_a is stored in the first memory device 140 (see case T in FIG. 5). In this case, when the subsequent data Data_a is stored in the first memory device 140, the memory allocator 230 may provide the attribute determiner 210 with information about the time alloc_t at which the subsequent data Data_a is stored in the first memory device 140.

For example, referring to FIG. 4, the ratio of hot pages provided by the memory allocator 230 from the page analyzer 220 may be 0.6. The first threshold ratio may be 0.5. That is, because the ratio of hot pages is greater than the first threshold ratio, this may mean that the attribute of a page in which pieces of recently accessed data are stored indicates a stronger tendency to be a hot page. Therefore, when the ratio of hot pages is greater than the first threshold ratio, there is also a strong likelihood that access to the subsequent data Data_a will be more frequently requested by the host. Accordingly, the host stores the subsequent data Data_a in the second memory device 150 when providing the subsequent data Data_a, thus improving the speed at which the subsequent data Data_a is provided in response to a request received from the host.

In an embodiment, the memory allocator 230 may be provided with information about the size of available space in the second memory device 150 from the second memory device 150. Here, when the size of the available space in the second memory device 150 is less than a threshold size, the subsequent data Data_a may not be stored in the second memory device 150. Therefore, the memory allocator 230 may control the first memory device 140 to store the subsequent data Data_a in the first memory device 140. Here, the memory allocator 230 may compare the ratio of hot pages, provided from the page analyzer 220, with a second threshold ratio greater than the first threshold ratio to determine whether the ratio of hot pages is greater than the second threshold ratio. When the ratio of hot pages is greater than the second threshold ratio, the memory allocator 230 may control the first memory device 140 and the second memory device 150 so that the subsequent data Data_a is stored in the first memory device 140 and the data stored in the first memory device 140 is then stored in the second memory device 150 when the size of the available space in the second memory device 150 becomes greater than the threshold size. The memory allocator 230 may determine the strength of a hot page tendency by comparing the ratio of hot pages with the second threshold ratio, and may store subsequent data in the second memory device 150 when there is available space in the second memory device 150, thus controlling the first memory device 140 and the second memory device 150 so that subsequent data Data_a for which access is expected to be more frequently requested is rapidly stored in the second memory device 150.

Figure 6:
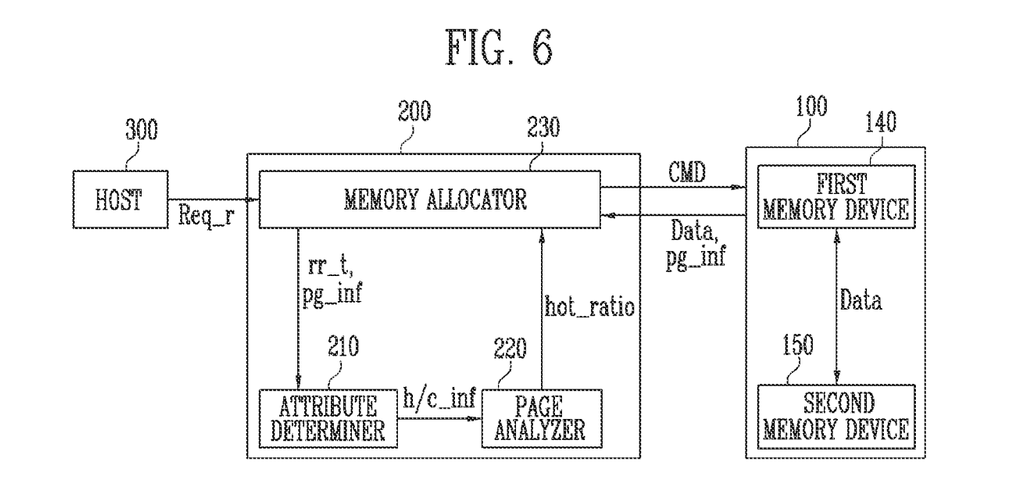
FIG. 6 is a diagram illustrating an operation of changing the ratio of hot pages according to an embodiment of the present disclosure.

FIG. 6 is a diagram illustrating an operation of changing the ratio of hot pages according to an embodiment of the present disclosure.

Referring to FIG. 6, a memory allocator 230 may receive a re-request Req_r to access data Data stored in a first memory device 140 or a second memory device 150 from a host 300. The memory allocator 230 may receive data Data and information pg_inf about pages in which the data Data is stored from the first memory device 140 or the second memory device 150, and may provide the data Data to the host 300. Here, the memory allocator 230 may provide the attribute determiner 210 with information about the time rr_t at which access to the data is re-requested by the host 300 and the information pg_inf about the pages in which the data is stored.

The attribute determiner 210 may update attribute information for the pages in which the data is stored based on information about the time r_t at which access to the data is requested and the information about the time rr_t at which access to the data is re-requested. In an embodiment, the attribute determiner 210 may set a re-access interval based on the information about the time r_t at which access to the data is requested and the information about the time rr_t at which access to the data is re-requested. The re-access interval may be an interval from the time at which access to the data is requested to the time at which access to the data is re-requested. The attribute determiner 210 may update respective attributes of the plurality of pages depending on the length of the re-access interval. Thereafter, the attribute determiner 210 may provide information h/c_inf about the updated attributes of the pages to the page analyzer 220.

The page analyzer 220 may update the ratio of hot pages hot_ratio having a hot page attribute to the plurality of pages based on the information h/c_inf about the updated attributes of the pages. In an embodiment, the page analyzer 220 may determine the ratio of hot pages hot_ratio indicating the ratio of hot pages having a hot page attribute to the plurality of pages included in the first memory device 140. Thereafter, the page analyzer 220 may provide information about the ratio of hot pages hot_ratio to the memory allocator 230.

The memory allocator 230 may determine the memory device in which subsequent data provided by the host 300 is to be stored based on the updated hot page ratio hot_ratio. In an example, the memory allocator 230 may control the second memory device 150 so that, when the updated hot page ratio hot_ratio is greater than a first threshold ratio, the subsequent data is stored in the second memory device 150. In an example, the memory allocator 230 may control the first memory device 140 so that, when the updated hot page ratio hot_ratio is less than or equal to the first threshold ratio, the subsequent data is stored in the first memory device 140. That is, the memory system 50 according to an embodiment of the present disclosure may update the attributes of the plurality of pages depending on the frequency of requests to access to data by the host 300, and may change the ratio of hot pages depending on the updated attributes of the plurality of pages, thus enabling the subsequent data to be stored in a memory device appropriate for the frequency of requests to access to the subsequent data.

Figure 7:
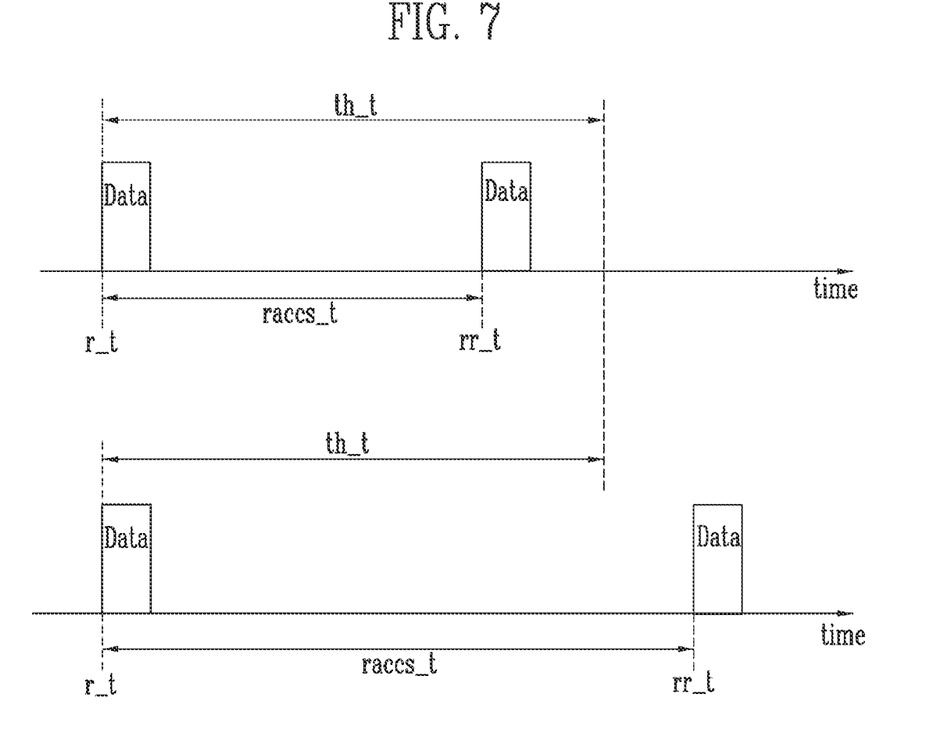
FIG. 7 is a diagram illustrating an operation of determining the attributes of a plurality of pages depending on the re-access interval according to an embodiment of the present disclosure.

FIG. 7 is a diagram illustrating an operation of determining the attributes of a plurality of pages depending on the re-access interval according to an embodiment of the present disclosure.

In FIG. 7, the horizontal axis of each of the graphs indicates time.

Referring to FIG. 7, the attribute determiner 210 of FIG. 6 may update the attributes of a plurality of pages by comparing a re-access interval raccs_t with a preset interval th_t. The re-access interval raccs_t may be set based on the time r_t at which access to data is requested and the time rr_t at which access to the data is re-requested. In detail, the difference between the time r_t at which access to data is requested and the time rr_t at which access to the data is re-requested may be set as the re-access interval raccs_t.

The graph in the upper portion of FIG. 7 shows the case where the re-access interval raccs_t for the data is shorter than the preset interval th_t. That is, when the re-access interval raccs_t for the data is shorter than the preset interval th_t, the attribute of the page in which the data is stored may be updated to indicate a hot page. Because the graph in the upper portion of FIG. 7 shows that access to data is re-requested within a preset time period from the time at which access to the data is requested, the attribute of the page in which the data is stored may be updated to indicate a hot page.

The graph in the lower portion of FIG. 7 shows the case where the re-access interval raccs_t for the data is longer than the preset interval th_t. That is, when the re-access interval raccs_t for the data is equal to or longer than the preset interval th_t, the attribute of the page in which the data is stored may be updated to indicate a cold page. Because the graph in the lower portion of FIG. 7 shows that access to the data is re-requested after the preset time period from the time at which access to the data was requested, the attribute of the page in which the data is stored may be updated to indicate a cold page.

Figure 8:
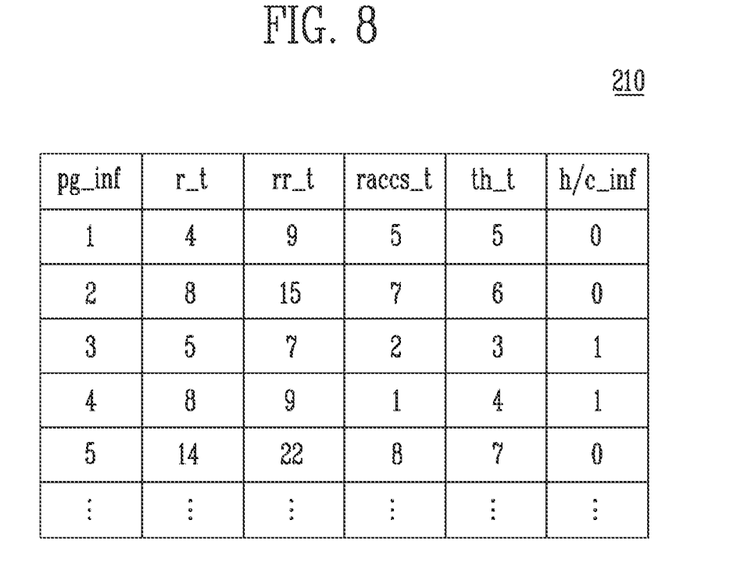
FIG. 8 is a diagram illustrating attribute information for a plurality of pages updated by an attribute determiner according to an embodiment of the present disclosure.

FIG. 8 is a diagram illustrating attribute information for a plurality of pages updated by an attribute determiner according to an embodiment of the present disclosure.

Referring to FIG. 8, information pg_inf about pages in which pieces of data are respectively stored, the time r_t at which access to the corresponding data is requested, the time rr_t at which access to the corresponding data is re-requested, a re-access interval raccs_t, a preset interval th_t, and information h/c_inf about the attributes of the pages may be stored. The information pg_inf about pages, stored in the attribute determiner 210, may be information about a plurality of pages included in a first memory device.

First, the case where access to data stored in a first page is re-requested in the table shown in FIG. 8 is described by way of example. The attribute determiner 210 may be provided with the information about the time r_t at which access to the data is requested from the memory allocator 230, and may then store the time r_t information. For example, the time at which access to the data stored in the first page is requested may be 4. Thereafter, when access to the data is re-requested, the attribute determiner 210 may be provided with the information about the time rr_t at which access to the data is re-requested from the memory allocator 230, and may then store the time rr_t information. For example, the time at which access to the data stored in the first page is re-requested may be 9. Also, the attribute determiner 210 may set the re-access interval raccs_t based on the time at which access to the data stored in the first page is requested and the time at which access to the data stored in the first page is re-requested. In an embodiment, the attribute determiner 210 may set the difference between the time at which access to the data stored in the first page is requested and the time at which access to the data stored in the first page is re-requested, as the re-access interval raccs_t. For example, the attribute determiner 210 may set the re-access interval raccs_t for the data stored in the first page to 5.

The attribute determiner 210 may update the attribute of the corresponding page by comparing the re-access interval raccs_t with the preset interval th_t. For example, because the re-access interval raccs_t for the data stored in the first page is equal to the preset interval th_t, the attribute of the first page may be determined to indicate a cold page. A cold page may be represented by a logical value of "0". That is, because access to the data stored in the first page is re-requested after a preset time period, the attribute of the first page may be updated to indicate a cold page. Compared to the example of FIG. 4, the attribute of the first page may be changed from a hot page attribute to a cold page attribute. In this way, the respective attributes of the plurality of pages may be changed depending on the re-access interval raccs_t.

As in the case where data stored in the first page was described as an example, the attribute determiner 210 may update the information h/c_inf about the attribute of each of the plurality of pages based on the result of a comparison between the re-access interval raccs_t for data stored in each of the plurality of pages and the preset interval th_t.

In an embodiment, after determining the attributes of the plurality of pages, the attribute determiner 210 may change the preset interval th_t depending on the determined attributes of the plurality of pages. For example, because, in FIG. 4, the attribute of the second page is determined to indicate a cold page, the frequency of requests to access the data stored in the second page may subsequently decrease. Accordingly, the attribute determiner 210 may set the preset interval th_t for the second page to a value greater than 5, and may then determine the attribute of the second page by comparing the preset interval th_t with the re-access interval raccs_t for the second page. As illustrated in FIG. 8, because the re-access interval raccs_t for the second page is increased from the access interval to 7 and the preset interval th_t for the second page is 6, the attribute of the second page may be determined to indicate a cold page. In an example, because the attribute of the third page is determined to indicate a hot page in FIG. 4, the frequency of requests to access the data stored in the third page may subsequently increase. Accordingly, the attribute determiner 210 may set the preset interval th_t for the third page to a value less than 5, and may then determine the attribute of the third page by comparing the preset interval th_t with the re-access interval raccs_t for the third page. As illustrated in FIG. 8, because the re-access interval raccs_t for the third page is increased from the access interval to 2 and the preset interval th_t for the third page is 3, the attribute of the third page may be determined to indicate a hot page.

In an embodiment, the attribute determiner 210 may change the preset interval th_t to be subsequently compared with the re-access interval raccs_t for each of the plurality of pages depending on the extent of the difference between the access interval for each of the plurality of pages and the corresponding preset interval. For example, referring to FIG. 4, because the difference between the access interval accs_t and the preset interval th_t for the third page is less than the difference between the access interval accs_t and the preset interval th_t for the fourth page, the attribute determiner 210 may set the preset interval th_t for the third page to a value less than the preset interval th_t for the fourth page. That is, as the access interval accs_t for a page is shorter, the corresponding page indicates a stronger tendency to be a hot page, and thus the preset interval th_t for the page indicating a stronger tendency to be a hot page may be set to a smaller value. In an example, because the difference between the access interval accs_t and the preset interval th_t for the fifth page is greater than the difference between the access interval accs_t and the preset interval th_t for the second page, the attribute determiner 210 may set the preset interval th_t for the fifth page to a value greater than the preset interval th_t for the second page. That is, as the access interval accs_t for a page is longer, the corresponding page indicates a stronger tendency to be a cold page, and thus the preset interval th_t for the page indicating a stronger tendency to be a cold page may be set to a larger value. Thereafter, the attribute determiner 210 may determine the respective attributes of the plurality of pages based on the changed preset intervals th_t for the plurality of pages. Next, the attribute determiner 210 may provide pieces of updated attribute information for the plurality of pages to the page analyzer 220. The page analyzer 220 may determine the ratio of hot pages based on the pieces of updated attribute information for the plurality of pages. For example, the page analyzer 220 may be provided with pieces of attribute information for the first to fifth pages, and may then determine the ratio of hot pages. Because the number of hot pages is 2 and the number of cold pages is 3, among the first to fifth pages, the ratio of hot pages may be 0.4. This means that the attributes of pages in which recently accessed data is stored indicate a higher tendency to be a cold page. Furthermore, compared to the example of FIG. 4, because the ratio of hot pages has changed from 0.6 to 0.4 depending on a re-request to access the data, it may be expected that the frequency of requests to access to subsequent data to be provided by the host will be low.

Figure 9:
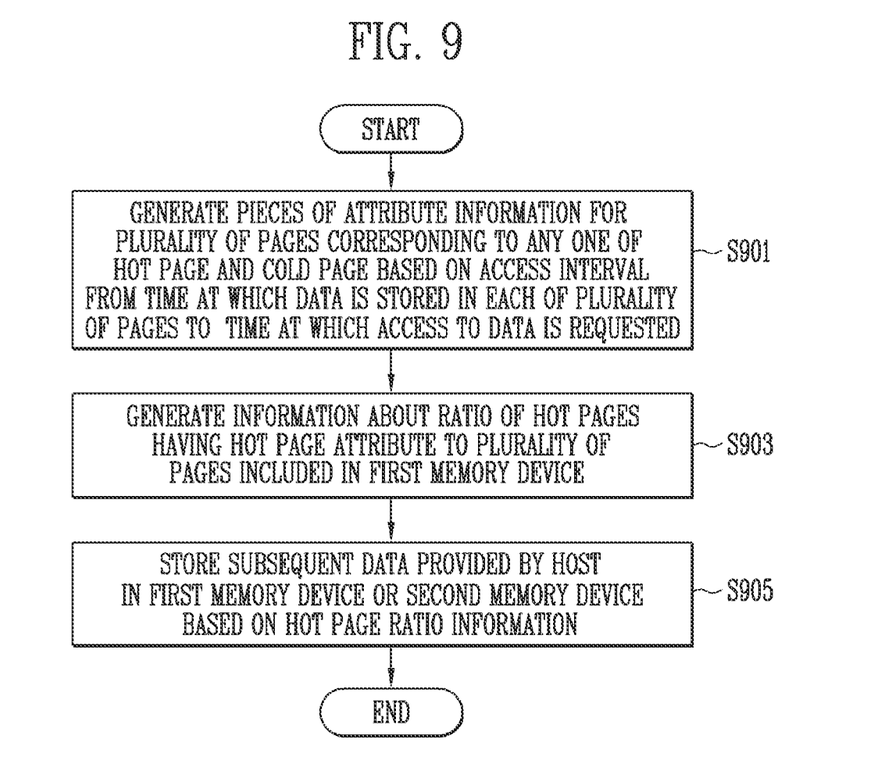
FIG. 9 is a flowchart illustrating a method of operating a memory system according to an embodiment of the present disclosure.

FIG. 9 is a flowchart illustrating a method of operating a memory system according to an embodiment of the present disclosure.

Referring to FIG. 9, at operation S901, the memory system 50 may generate pieces of attribute information respectively for a plurality of pages, each corresponding to one of a hot page and a cold page, based on an access interval from the time at which data is stored in each of the plurality of pages to the time at which access to the data is requested. In an embodiment, the memory system 50 may generate, as corresponding to the cold page, the attribute information for first pages, for which an access interval is equal to or longer than a preset interval. In an embodiment, the memory system 50 may generate, as corresponding to the hot page, the attribute information for second pages, for which an access interval is shorter than the preset interval.

At operation S903, the memory system 50 may generate information about the ratio of hot pages having a hot page attribute to a plurality of pages included in a first memory device. The information about the ratio of hot pages may be determined depending on the ratio of the number of hot pages included in the first memory device to the sum of the numbers of hot pages and cold pages included in the first memory device.

At operation S905, the memory system 50 may store subsequent data provided by the host in the first memory device or a second memory device based on the information about the ratio of hot pages. For example, the memory system 50 may determine the memory device in which the subsequent data is to be stored based on the result of a comparison between the ratio of hot pages and a first threshold ratio.

Figure 10:
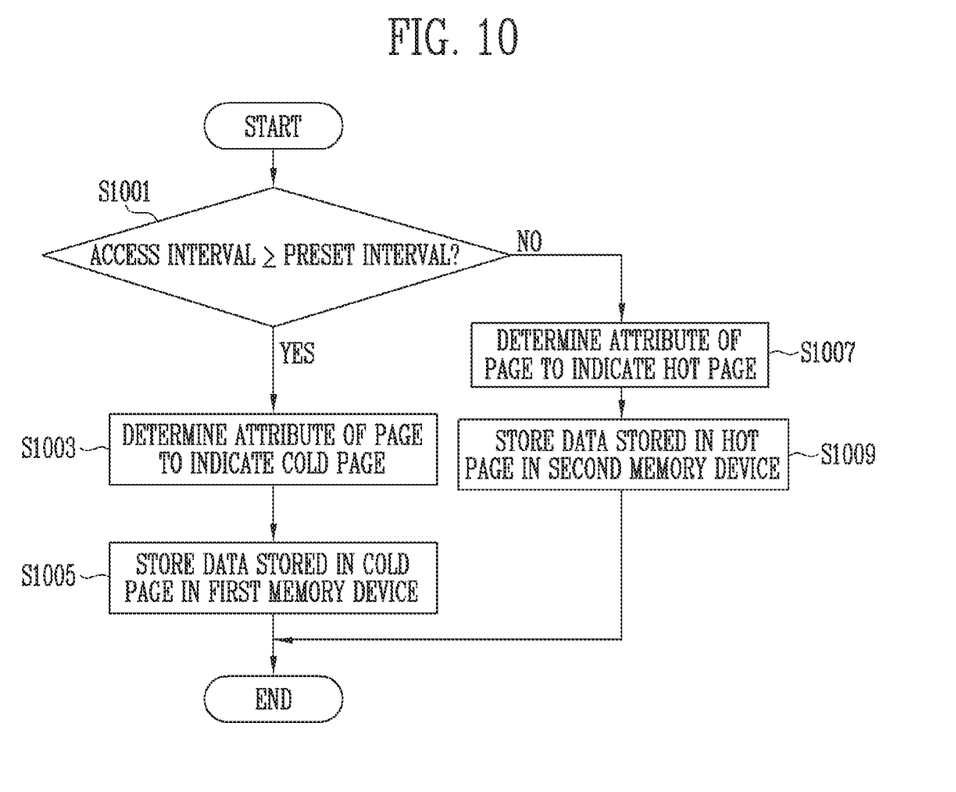
FIG. 10 is a flowchart illustrating a method of determining the attributes of a plurality of pages depending on the access interval according to an embodiment of the present disclosure.

FIG. 10 is a flowchart illustrating a method of determining the attributes of a plurality of pages depending on the access interval according to an embodiment of the present disclosure.

Referring to FIG. 10, at operation S1001, the memory system 50 may compare an access interval with a preset interval to determine whether the access interval is longer than the preset interval. The access interval may be an interval from the time at which data is stored in a first memory device or a second memory device to the time at which access to the data is requested. When the access interval is equal to or longer than the preset interval, operation S1003 may be performed. On the other hand, when the access interval is shorter than the preset interval, operation S1007 may be performed.

At operation S1003, the memory system 50 may determine the attribute of the page in which the data is stored to indicate a cold page when the access interval is equal to or longer than the preset interval.

At operation S1005, the memory system 50 may store (move) the data, stored in the cold page, in (to) the first memory device.

At operation S1007, the memory system 50 may determine the attribute of the page in which the data is stored to indicate a hot page when the access interval is shorter than the preset interval.

At operation S1009, the memory system 50 may store the data, stored in the hot page, in the second memory device.

Figure 11:
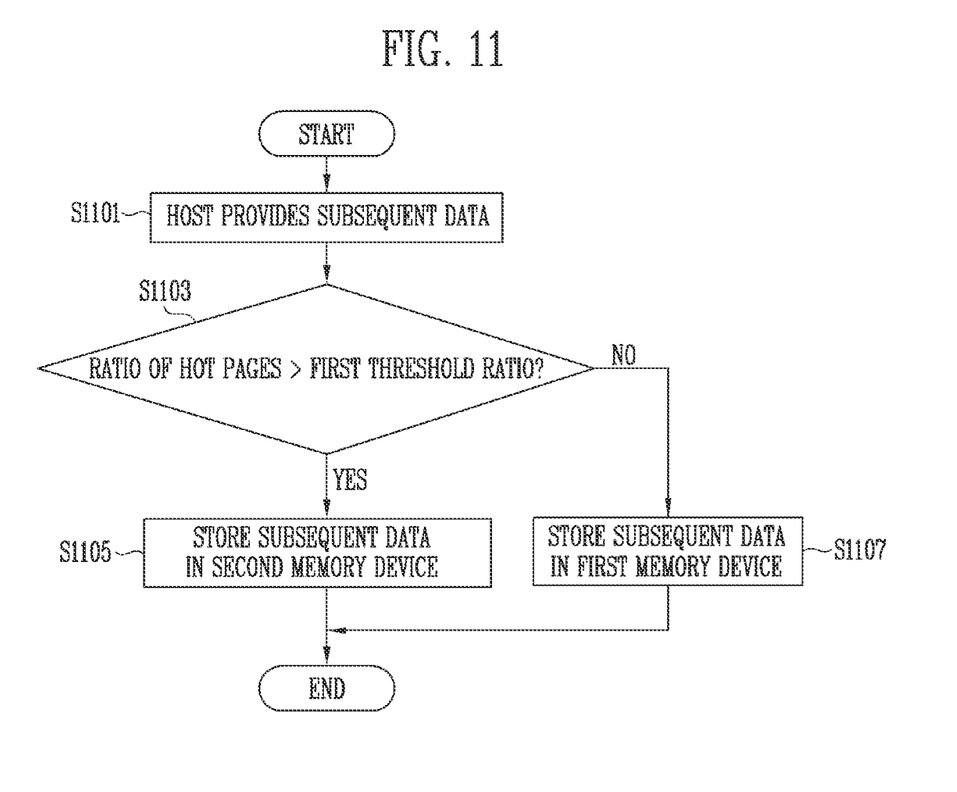
FIG. 11 is a flowchart illustrating a method of storing subsequent data in a memory device based on the ratio of hot pages according to an embodiment of the present disclosure.

FIG. 11 is a flowchart illustrating a method of storing subsequent data in a memory device based on the ratio of hot pages according to an embodiment of the present disclosure.

Referring to FIG. 11, at operation S1101, the host 300 may provide subsequent data to the memory system 50.

At operation S1103, the memory system 50 may compare the ratio of hot pages with a first threshold ratio to determine whether the ratio of hot pages is greater than the first threshold ratio. When it is determined that the ratio of hot pages is greater than the first threshold ratio, operation S1105 may be performed. On the other hand, when the ratio of hot pages is less than or equal to the first threshold ratio, operation S1107 may be performed.

When the ratio of hot pages is greater than the first threshold ratio, the memory system 50 may store the subsequent data in the second memory device at operation S1105.

When the ratio of hot pages is less than or equal to the first threshold ratio, the memory system 50 may store the subsequent data in the first memory device at operation S1107.

Figure 12:
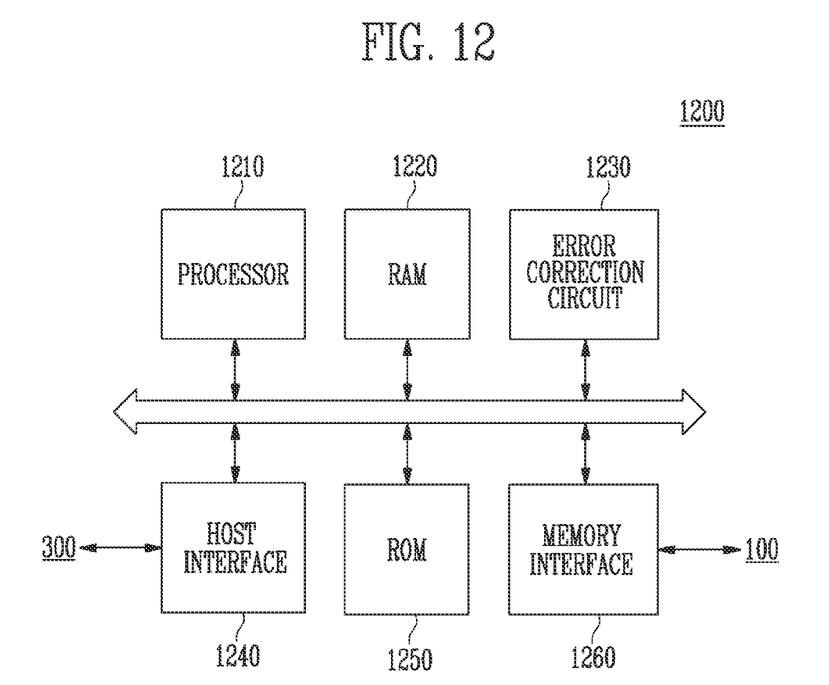
FIG. 12 is a diagram illustrating a memory controller of FIG. 1 according to an embodiment of the present disclosure.

FIG. 12 is a diagram illustrating the memory controller of FIG. 1 according to an embodiment of the present disclosure.

The memory controller 1200 of FIG. 12 may be the memory controller 200 of FIG. 1.

Referring to FIG. 12, the memory controller 1200 may include a processor 1210, a random access memory (RAM) 1220, an error correction circuit 1230, a host interface 1240, a read only memory (ROM) 1250, and a memory interface 1260.

The processor 1210 may control the overall operation of the memory controller 1200. In an embodiment, the processor 1210 may control a first memory device and a second memory device so that subsequent data provided by the host 300 is stored in one of the first memory device and the second memory device based on the ratio of hot pages.

The RAM 1220 may be used as a buffer memory, a cache memory or a working memory of the memory controller 1200. In an embodiment, the RAM 1220 may store information about the time at which data is stored in the first memory device or the second memory device, information about the time at which access to the data is requested, and information about the time at which access to the data is re-requested.

The error correction circuit 1230 may perform error correction. The error correction circuit 1230 may perform error correction code (ECC) encoding based on data to be written to a semiconductor memory 100 through the memory interface 1260. The ECC-encoded data may be transferred to the semiconductor memory 100 through the memory interface 1260. The error correction circuit 1230 may perform error correction decoding (ECC decoding) on data received from the semiconductor memory 100 through the memory interface 1260. In an embodiment, the error correction circuit 1230 may be included, as a component of the memory interface 1260, in the memory interface 1260.

The ROM 1250 may store various types of information required for the operation of the memory controller 1200 in the form of firmware.

The memory controller 1200 may communicate with an external device (e.g., a host 300, an application processor, or the like) through the host interface 1240. The memory controller 1200 may be provided with data through the host interface 1240.

The memory controller 1200 may communicate with the semiconductor memory 100 through the memory interface 1260. The memory controller 1200 may transmit a command, an address, a control signal, etc. to the semiconductor memory 100 and receive data from the semiconductor memory 100, through the memory interface 1260. In an example, the memory interface 1260 may include a NAND interface.

Figure 13:
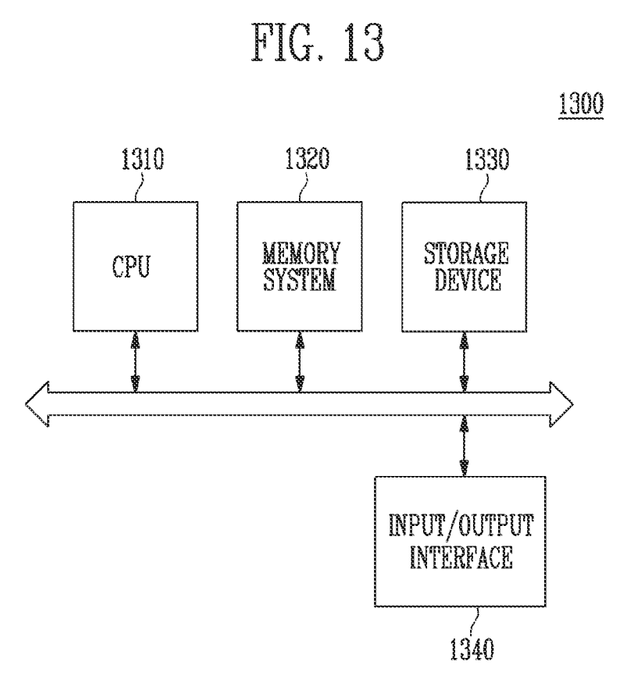
FIG. 13 is a diagram illustrating a computer system to which a memory system according to an embodiment of the present disclosure is applied.

FIG. 13 is a diagram illustrating a computer system to which a memory system according to an embodiment of the present disclosure is applied.

Referring to FIG. 13, a computer system 1300 may include a central processing unit (CPU) 1310, a memory system 1320, a storage device 1330, and an input/output interface 1340, which are coupled to a system bus.

The CPU 1310 may be a processor for processing computations performed by the computer system 1300. The CPU 1310 may control the overall operation of the computer system 1300. The CPU 1310 may access the memory system 1320. The CPU 1310 may store data in the memory system 1320, or may process or execute data stored in the memory system 1320.

The memory system 1320 may temporarily store data. The memory system 1320 may be configured in the same manner as the memory system 50 illustrated in FIG. 1. For example, both a first memory device 140 and a second memory device 150 included in the memory system 1320 may be implemented as volatile memory devices. In an embodiment, the memory system 1320 may be implemented as a main memory device of the CPU 1310. The memory system 1320 may store file system-format data or store an operating system program. The operating system program executed by the CPU 1310 may be read from the storage device 1330, and may be stored in the memory system 1320.

The storage device 1330 may be implemented as one of a hard disk drive (HDD) and a solid state drive (SSD). The storage device 1330 may be a device which stores data for a long period of time. The storage device 1330 may be a nonvolatile memory device. The storage device 1330 may store an operating system (OS) and an application program (AP).

The input/output interface 1340 may include an input Interface and an output interface. The input interface may be coupled to an external input device. The external input device may include a keyboard, a mouse, a microphone or a scanner. A user may input a command, data, and information to the computer system 1300 through the external input device.

The output interface may be coupled to an external output device. The external output device may include a monitor, a printer or a speaker. The output interface may provide the results of processing the command, data or information that is input by the user through the external input device to the external output device.

In accordance with the present disclosure, there are provided a memory controller that is capable of improving the speed at which data is provided in response to an external request and a memory system including the memory controller.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Further, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory controller, comprising:
   an attribute determiner configured to determine an attribute of each of a plurality of pages included in a first external device to indicate one of a hot page and a cold page, based on an access interval which is an interval from a time at which data is stored in each of the plurality of pages to a time at which access to the data is requested;
   a page analyzer configured to count a number of hot pages and a number of cold pages among the plurality of pages, and determine, as a ratio of hot pages having a hot page attribute to the plurality of pages, a ratio of the number of hot pages to a sum of the number of hot pages and the number of cold pages; and
   a memory allocator configured to control one of the first external device and a second external device to store therein externally provided data based on the ratio of hot pages.

2. The memory controller according to claim 1, wherein the first external device and the second external device are different types of memories.

3. The memory controller according to claim 2, wherein the attribute determiner is configured to determine an attribute of first pages, for which the access interval is equal to or longer than a preset interval among the plurality of pages, to indicate a cold page, and
   determine an attribute of second pages, for which the access interval is shorter than the preset interval among the plurality of pages, to indicate a hot page.

4. The memory controller according to claim 3, wherein the memory allocator is configured to control the first external device and the second external device such that data stored in the first pages is moved to the first external device and data stored in the second pages is moved to the second external device.

5. The memory controller according to claim 3, wherein the memory allocator is configured to control the second external device to store therein the externally provided data when the ratio of hot pages is greater than a first threshold ratio.

6. The memory controller according to claim 3, wherein the memory allocator is configured to control the first external device to store therein the externally provided data when the ratio of hot pages is less than or equal to a first threshold ratio.

7. The memory controller according to claim 3, wherein
   the attribute determiner is further configured to update the attributes of the plurality of pages based on a result of a comparison between the preset interval and a re-access interval from the time at which access to the data is requested to a time at which access to the data is re-requested, and
   wherein the page analyzer is further configured to determine the ratio of hot pages based on the updated attributes of the plurality of pages.

8. The memory controller according to claim 6, wherein the memory allocator is configured to
   control the first external device to store therein the externally provided data when a size of an available space in the second external device is less than a threshold size and the ratio of hot pages is greater than a second threshold ratio, which is greater than the first threshold ratio, and
   control the second external device to store therein the externally provided data when the size of the available space in the second external device becomes greater than the threshold size.

9. A method of operating a memory controller, the method comprising:
   generating pieces of attribute information respectively for a plurality of pages included in a first external device based on an access interval which is an interval from a time at which data is stored in each of the plurality of pages to a time at which access to the data is requested, wherein the attribute information for each of the plurality of pages corresponds to one of a hot page and a cold page;

counting a number of hot pages and a number of cold pages among the plurality of pages;

generating, as information about a ratio of hot pages having a hot page attribute to the plurality of pages, a ratio of the number of hot pages to a sum of the number of hot pages and the number of cold pages; and storing externally provided data in the first external device or a second external device based on the information about the ratio of hot pages.

10. The method according to claim 9, wherein the first external device is a memory of a type different from a type of the second external device.

11. The method according to claim 10, wherein the generating the pieces of attribute information comprises:

generating attribute information corresponding to the cold page, as attribute information for first pages for which the access interval is equal to or longer than a preset interval among the plurality of pages; and generating attribute information corresponding to the hot page, as attribute information for second pages for which the access interval is shorter than the preset interval among the plurality of pages.

12. The method according to claim 11, further comprising moving data stored in the first pages to the first external device and moving data stored in the second pages to the second external device.

13. The method according to claim 11, wherein the storing the externally provided data in the first external device or the second external device comprises storing the externally provided data in the second external device when the ratio of hot pages is greater than a first threshold ratio.

14. The method according to claim 11, wherein the storing the externally provided data in the first external device or the second external device further comprises storing the externally provided data in the first external device when the ratio of hot pages is less than or equal to a first threshold ratio.

15. The method according to claim 11, wherein the generating the pieces of attribute information further comprises:

updating the pieces of attribute information for the plurality of pages based on a result of a comparison between the preset interval and a re-access interval from the time at which access to the data is requested to a time at which access to the data is re-requested.

16. The method according to claim 15, wherein the generating, as the information about the ratio of hot pages, the ratio of the number of hot pages further comprises generating, based on the pieces of updated attribute information for the plurality of pages, the information about the ratio of hot pages having the hot page attribute to the plurality of pages.

17. The method according to claim 14, wherein the storing the externally provided data in the first external device or the second external device further comprises:

storing the externally provided data in the first external device when a size of an available space in the second external device is less than a threshold size and the ratio of hot pages is greater than a second threshold ratio, which is greater than the first threshold ratio; and storing the externally provided data in the second external device when the size of the available space in the second external device becomes greater than the threshold size.

18. A memory system, comprising:

a first memory including a plurality of pages;

a second memory of a type different from a type of the first memory; and a memory controller configured to determine each of the plurality of pages to indicate a hot page or a cold page depending on whether access to data stored in each of the plurality of pages is requested within a preset time period from a time at which the data is stored in each of the plurality of pages in response to an external request, count a number of hot pages and a number of cold pages among the plurality of pages, determine, as a ratio of hot pages having a hot page attribute to the plurality of pages, a ratio of the number of hot pages to a sum of the number of hot pages and the number of cold pages, and control one of the first memory and the second memory to store therein externally provided data based on the ratio of hot pages.

\* \* \* \* \*